United States Patent Office 3,592,793
Patented July 13, 1971

3,592,793
SCORCH RETARDANT
Edwin J. Latos, Chicago, Ill., assignor to Universal Oil
Products Company, Des Plaines, Ill.
No Drawing. Filed July 10, 1969, Ser. No. 840,821
Int. Cl. C08c 11/12, 11/46; C08d 11/04
U.S. Cl. 260—41.5                              10 Claims

ABSTRACT OF THE DISCLOSURE

Retarding scorch in a curable rubber composition containing a phenylenediamine antiozonant by incorporating calcium silicate therein.

BACKGROUND OF THE INVENTION

In the processing of rubber compositions, a number of different ingredients are milled together. One of the problems associated during such milling is described in the industry as "scorch" and refers to prevulcanization of the rubber prior to curing.

DESCRIPTION OF THE INVENTION

It has been found that the scorch tendencies of rubber compositions are enhanced when a phenylenediamine antiozonant is incorporated into the rubber composition. However, because of the necessity to protect the final rubber against deterioration due to ozone, the incorporation of an antiozonant into rubber is highly desirable. The present invention provides a novel method of retaining the benefits of the protection against ozone and at the same time offsetting the decrease in scorch time due to the use of the phenylenediamine antiozonant.

It has been found that calcium silicate appears unique as an effective method of retarding scorch in rubber compositions containing a phenylenediamine antiozonant. The rubber compositions which may be treated in accordance with the present invention include natural rubbers and synthetic rubbers which are subjected to curing during preparation thereof. In general, rubber is classified as a vulcanizable diene hydrocarbon rubber and comprises polymers of conjugated 1,3-dienes, either as polymers thereof or as copolymers thereof with other polymerizable compounds. Natural rubbers include hevea rubber, caoutchouc, balata, gutta-percha, etc. Synthetic rubbers include butadiene-styrene copolymer rubber referred to in the art as SBR, Buna N rubber (NBR) produced from butadiene and acrylonitrile, Butyl rubber produced from butadiene and isobutylene, neoprene, ethylenepropylene copolymer rubber (EP), terpolymer rubbers as EP terpolymers, polychloroprene, polyisoprene, polybutadiene, etc. It is understood that the term rubber as used in the present specification and claims is intended to include both synthetic rubber and natural rubber which are subjected to curing as a step in the manufacture thereof.

As hereinbefore set forth, it appears that calcium silicate is unique in effecting the retarding of scorch in the presence of the phenylenediamine antiozonant. This uniqueness will be exemplified in the examples appended to the present specifications in which it is shown that other calcium containing compounds are either of no effect or only of negligible benefit in this regard. Similarly, it will be shown that silica alone or other silicates are likewise ineffective or of only minor benefit.

Any suitable phenylenediamine antiozonant is used in the present invention. In one embodiment the phenylenediamine antiozonant is an N,N'-di-sec-alkyl-p-phenylenediamine in which each alkyl contains from 3 to about 20 carbon atoms and preferably from about 6 to about 10 carbon atoms. Particularly preferred antiozonants are N,N'-di-sec-heptyl-p-phenylenediamines and more particularly N,N'-di-(1,4-dimethylpentyl)-p-phenylenediamine and N,N'-di-sec-octyl-p-phenylenediamines and particularly N,N' - di-(1-ethyl-3-methylpentyl)-p-phenylenediamine and N,N'-di-(1-methylheptyl)-p-phenylenediamine. Other N,N'-di-sec-alkyl-p-phenylenediamines include N,N'-di-sec-hexyl-p-phenylenediamine, including N,N'-di-(1-methylpentyl)-p-phenylenediamine and N,N'-di-(1-ethylbutyl)-p-phenylenediamine, other N,N'-di-sec-heptyl-p-phenylenediamines including N,N'-di-(1-ethylpentyl)-p-phenylenediamine, N,N'-di-(1-propylbutyl)-p-phenylenediamine, other N,N'-di-sec-octyl-p-phenylenediamines including N,N' - di - (1-propylpentyl)-p-phenylenediamine, N,N'-di-sec-nonyl-p-phenylenediamines including N,N'-di-(1-methyloctyl)-p-phenylenediamine, N,N'-di-(1-ethylheptyl)-p-phenylenediamine, N,N' - di-(1-butylpentyl)-p-phenylenediamine, etc., and N,N'-di-sec-decyl-p-phenylenediamines including N,N'-di-(1-methylnonyl)-p-phenylenediamine. N,N'-di-(1-ethyloctyl)-p-phenylenediamine, N,N'-di-(1-propylheptyl)-p-phenylenediamine, N,N'-di-(1-butylhexyl)-p-phenylenediamine, etc.

In another embodiment, the phenylenediamine antiozonant is an N-phenyl-N'-sec-alkyl-p-phenylenediamine in which the alkyl contains from 3 to about 20 and preferably from 3 to 10 carbon atoms. Particularly preferred antiozonants in this embodiment include N-phenyl-N'-(1,3-dimethylbutyl)-p-phenylenediamine and N-phenyl-N'-(2-octyl)-p-phenylenediamine. Other preferred antiozonants in this embodiment include N-phenyl-N'-isopropyl-p-phenylenediamine, N-phenyl-N'-(1-methylpropyl)-p-phenylenediamine, N-phenyl-N'-(sec-pentyl)-p-phenylenediamine including N-phenyl-N'-(1-methylbutyl)-p-phenylenediamine and N-phenyl-N'-(1-ethylpropyl)-p-phenylenediamine, other N-phenyl-N'-(sec-hexyl)-p-phenylenediamines including N-phenyl-N'-(1-methylpentyl)-p-phenylenediamine and N - phenyl-N'-(1-ethylbutyl)-p-phenylenediamine, N - phenyl-N'-sec-heptyl-p-phenylenediamines including N-phenyl-N'-(1-methylhexyl)-p-phenylenediamine, N-phenyl-N'-(1-ethylpentyl)-p-phenylenediamine, N-phenyl-N'-(1-ethyl-3-methylbutyl)-p-phenylenediamine and N-phenyl-N'-(1-propylbutyl)-p-phenylenediamine, other N-phenyl-N'-(sec-octyl)-p-phenylenediamines including N-phenyl-N'-(1-ethylhexyl)-p-phenylenediamine, N - phenyl - N' - (1-ethyl-4-methylpentyl)-p-phenylenediamine and N-phenyl-N'-(1-propylpentyl)-p-phenylenediamine, N-phenyl-N'-(sec-nonyl)-p-phenylenediamines including N-phenyl-N'-(1-methyloctyl)-p-phenylenediamine, N-phenyl-N'-(1,6-di-methylheptyl)-p-phenylenediamine, N-phenyl-N'-(1-ethylheptyl)-p-phenylenediamine and N-phenyl-N'-(1-propylhexyl)-p-phenylenediamine, and N-phenyl-N'-(sec-decyl)-p-phenylenediamines including N - phenyl-N'-(1-methylnonyl)-p-phenylenediamine, N - phenyl-N'-(1,7-dimethyloctyl)-p-phenylenediamine, N-phenyl-N'-(1-ethyloctyl)-p-phenylenediamine, N-phenyl-N'-(1,5 - di-ethylhexyl)-p-phenylenediamine, N-phenyl-N'-(1-butylhexyl)-p-phenylenediamine, etc.

In still another embodiment the pheneylenediamine antiozonant is an N,N'-di-cycloalkyl-p-phenylenediamine and particularly N,N'-di-cyclohexyl-p-phenylenediamine.

The phenylenediamine antiozonants are available commercially or may be prepared in any suitable manner. In a preferred method, these are prepared by the reductive alkylation of p-phenylenediamine or p-nitroaniline with the desired ketone. For example, N,N'-di-(1-methylheptyl)-p-phenylenediamine is prepared by the reductive alkylation of 1 mol proportion of p-nitroaniline with 2 mol proportions of methyl hexyl ketone. Similarly, N-phenyl-N'-(1,3-di-methylbutyl) - p - phenylenediamine is prepared by the reductive alkylation of equal mol proportions of p-aminodiphenylamine, p-nitrodiphenylamine or p-nitrosodiphenylamine with methylisobutyl ketone. In a similar manner, N-pheny-N'-(1-methylheptyl)-p-phenylenediamine is prepared by the reductive alkylation of equal mol proportions of p-aminodiphenylamine with methyl hexyl ketone. Also, N,N'-dicyclohexyl-p-phenylenediamine is prepared by the reductive alkylation of one mol proportion of p-nitroaniline with 2 mol proportions of cyclohexanone.

The reductive alkylation is effected in any suitable manner and generally under a hydrogen pressure of from about 100 to 3,000 p.s.i. or more and more particularly of from about 1,000 to about 2,000 p.s.i. and a temperature of from about 200° to about 500° F. and more particularly from about 250° to about 350° F. Generally an excess of ketone is used in the reaction mixture and may comprise up to about 20 or more mols of ketone per mol of p-nitroaniline or p-phenylenediamine. Any suitable reductive alkylation catalyst is used. One catalyst comprises an intimate mixture of copper oxide, chromium oxide and barium oxide. Other catalysts include those containing nickel, molybdenum, platinum and/or palladium. A particularly preferred catalyst comprises a composite of alumina with from about 0.1 to 10% or more of platinum, which composite may or may not contain chlorine and/or fluorine in a total concentration of from about 0.2 to 10% or more by weight of the composite.

The phenylenediamine antiozonant is used in a sufficient concentration to effect the desired stabilization. The concentration may range from about 1.5% to about 6% and more particularly from 2% to 4% by weight of the rubber, although higher or lower concentrations may be employed when desired. These concentrations are based on the rubber hydrocarbon exclusive of the other components of the rubber composition and are used in this manner in the present specifications and claims.

As hereinbefore set forth and as will be illustrated in the appended examples, the phenylenediamine antiozonant decreases the scorch time. This is offset at least in part, in accordance with the present invention by incorporating calcium silicate into the rubber composition. The calcium silicate may be prepared synthetically or is available commercially. A suitable calcium silicate is available commercially under the tradename of "Silene EF." Another calcium silicate is available commercially as "Silene L." The calcium silicate is used in the composition in a concentration of from about 2 to about 10 and preferably from about 3 to about 7 parts per 100 parts of rubber hydrocarbon.

Conventional rubber formulations including oil extended rubber, may be used and may include, in addition to the phenylenediamine antiozonant and calcium silicate, one or more antioxidants, one or more accelerators, retarders, fillers, softeners, extenders, wax reinforcing agents, etc. Illustrative antioxidants include 2,6-di-tert-butyl - 4 - methylphenol, phenyl - beta - naphthylamine, 6-phenyl-2,2,4-trimethyl - 1,2 - dihydroquinoline, marketed under the tradename of "Santoflex-B", 2,2'-methylene-bis-(4-methyl-6-tert-butyl-phenol), 2,6-di-tert-butyl-p-cresol, the reaction product of acetone and diphenylamine, marketed under the tradename of "B.L.E.," etc. These antioxidants generally are used in a concentration of from about 0.5% to about 3% by weight of the rubber hydrocarbon. Conventional accelerators include benzothiazole sulfenamides, other thiazoles, thiuram sulfides, guanidine, dithiocarbamates, etc.

When desired, the composition of the present invention also is used along with paraffin and/or microcrystalline wax. The wax generally is utilized in a concentration of from 0.5% to about 3% by weight of the rubber hydrocarbon.

While the calcium silicate will serve to retard scorch, it is understood that the extent thereof may vary with different ingredients in the rubber formulation. Accordingly it is preferred that the rubber formulation be selected to produce satisfactory scorch time for the specific system being used in compounding the rubber. In addition to serving to retard scorch, the calcium silicate also serves as a filler in the rubber composition.

Conventional milling procedure may be employed, with the calcium silicate being incorporated into the composition either separately or along with one or more of the other ingredients.

The following examples are introduced to illustrate further the novelty and utility of the present invention but not with the intention of unduly limiting the same.

EXAMPLE I

The rubber composition of this example is a synthetic styrene-butadiene rubber of the following base recipe:

| Ingredients: | Parts by weight |
| --- | --- |
| SBR 1502 | 100 |
| Furnace black | 40 |
| Zinc oxide | 3 |
| Stearic acid | 2 |
| Sulfur | 2 |
| Accelerator [1] | 1.25 |
| Pheneylenediamine antiozonant [2] | As indicated |

[1] N-cyclohexyl-2-benzothiazole sulfenamide.
[2] N,N'-di-(1,4-dimethylpentyl)-p-phenylenediamine.

Calcium silicate was incorporated into other batches of the above base formulation.

Scorch values are determined with the large rotor Mooney viscometer at 250° F. (ASTM D–1077–55T). The values represent the number of minutes for a rubber containing a curing agent to increase viscosity by 5 and then 20 points. This method simulates conditions encountered during milling. Thus, a high scorch value indicates a high resistance to scorching.

The following table reports results in the evaluation of different batches. One batch did not contain either the phenylenediamine antiozonant or the calcium silicate. Another batch contained 2 parts calcium silicate but not the phenylenediamine antiozonant. Another batch contained 3 parts of phenylenediamine antiozonant and not the calcium silicate. Still another batch contained 3 parts of the phenylenediamine antiozonant and 2 parts calcium silicate.

TABLE I

| | Additive | | Mooney scorch | |
| --- | --- | --- | --- | --- |
| | Calcium silicate, phr. | Antiozonant, phr. | 5 pt. rise | 20 pt. rise |
| Run No.: | | | | |
| 1 | None | None | 60.2 | 66.3 |
| 2 | 2 | | 75.1 | 81.2 |
| 3 | None | 3 | 15.7 | 17.1 |
| 4 | 2 | 3 | 25.6 | 27.7 |

From the data in the above table it will be seen that the scorch time decreased from 60.2 and 66.3 to 15.7 and 17.1 minutes for the 5 pt. and 20 pt. rise, respectively, upon the addition of the phenylenediamine antiozonant. However, upon the addition of the calcium silicate, the scorch time was increased to 25.6 and 27.7 minutes, respectively.

The four samples described above were separately prepared as test strips and evaluated for antiozonant activity in a conventional static system. This method entails placing the rubber samples in an ozone cabinet, exposing the samples to ozone in a concentration of 50 parts of ozone per 100 million parts of air at a temperature of 100° F. and determining the time to first crack. Prior to exposure in the ozone cabinet, different samples were elongated 10%, 20% and 30% respectively. All of the samples which did not contain the phenylenediamine antiozonant underwent cracking within one hour of exposure in the ozone cabinet. Both samples containing the phenylenediamine antiozonant (one sample also containing calcium silicate) did not undergo cracking for greater than 164 hours of exposure in the ozone cabinet. This demonstrates that the calcium silicate did not adversely affect the antiozonant properties of the rubber samples.

EXAMPLE II

As hereinbefore set forth calcium silicate appears to be unique for this purpose. This is illustrated by the results obtained when other samples of the base rubber formulation described in Example I were prepared to contain two parts of calcium sulfide and 3 parts of the same phenylenediamine antiozonant and evaluated in the same manner as described in Example I. The results with the samples of rubber containing calcium sulfide were 16.6 for 5 pt. rise and 18.1 for 20 pt. rise. It will be noted that the scorch values are only about one minute longer than for the sample containing the antiozonant but no silicate (Run No. 3 in Table I).

EXAMPLE III

A similar comparison was made using calcium oxide. In the sample containing 1 part of calcium oxide and 3 parts of the same phenylenediamine antiozonant, the results obtained were 14.5 for the 5 pt. rise and 16.0 for the 20 pt. rise. It will be noted that the calcium oxide actually reduced the scorch time. Here again, a comparison should be made with Run No. 3 in Table I above.

EXAMPLE IV

Another calcium compound evaluated in the same manner was calcium carbonate. When used in another sample of the base rubber formulation described in Example I, at a concentration of 2 parts, along with 3 parts of the same phenylenediamine antiozonant, the scroch time was 14.5 for the 5 pt. rise and 15.9 for the 20 pt. rise. Here again, the scorch values are less than obtained in Run No. 3 of Table I above.

EXAMPLE V

Another series of evaluations was made using a tank tread stock of the following base recipe:

| Ingredients: | Parts by weight |
|---|---|
| SBR (Philprene 1609) | 145.0 |
| Carbon black | 15.0 |
| Zinc oxide | 5.0 |
| Mineral rubber (Witco 38 MR) | 5.0 |
| Stearic acid | 2.0 |
| Sulfur | 1.80 |
| Santoflex DD [1] | 1.0 |
| Agerite resin D [2] | 1.0 |
| Santocure NS [3] | 0.65 |
| DIBS [4] | 0.65 |
| Antiozonant [5] | As indicated |
| Calcium silicate | As indicated |

[1] 6-dodecyl-1,2-dihydro-2,2,4-trimethylquinoline.
[2] Polymerized trimethyldihydroquinoline.
[3] n-Tert-butyl-2-benzothiazole-sulfenamide.
[4] N,N-diisopropyl-benzothiazole-2-sulfenamide.
[5] N,N'-dicyclohexyl-p-phenylenediamine.

The results of evaluations of these samples are reported in the following table.

TABLE II

| | Additive | | Mooney scorch | |
|---|---|---|---|---|
| Run No.: | Calcium silicate, phr. | Antiozonant, phr. | 5 pt. rise | 20 pt. rise |
| 5 | None | None | 61.3 | 77.1 |
| 6 | 2 | None | 66.1 | 86.7 |
| 7 | 4 | None | 77.3 | 102.1 |
| 8 | 6 | None | 80.0 | 102.7 |
| 9 | None | 3 | 27.6 | 34.6 |
| 10 | 2 | 3 | 28.4 | 35.8 |
| 11 | 4 | 3 | 38.9 | 48.6 |
| 12 | 6 | 3 | 40.6 | 53.4 |

From the data in the above table, it will be noted that, in this formulation, calcium silicate at 2 parts was only moderately effective but that at 4 parts and at 6 parts it was considerably effective in extending the scorch time from 27.6 and 34.6 to 38.9 and 48.6 minutes, respectively, at 4 parts and to 40.6 and 53.4 minutes, respectively, at 6 parts.

EXAMPLE VI

As hereinbefore set forth calcium silicate appears unique for this purpose. A series of evaluations was made using magnesium silicate. The base rubber formulation used in this example is the tank tread stock described in Example V. The sample which did not contain either the silicate or the antiozonant is the same as Run No. 5 in Table II. A sample of the rubber containing 4 parts of magnesium silicate and 3 parts of N,N'-dicyclohexyl-p-phenylenediamine antiozonant gave a 5 pt. rise of 26 and a 20 pt. rise of 32.9 minutes. It will be noted that this is substantially the same as the results obtained in the sample containing the phenylene-diamine antiozonant but no silicate (see Run No. 9 in Table II of Example V). This further confirms the criticality of the calcium silicate as being unique in this function.

Another series of evaluations was made using a different SBR rubber formulation including magnesium silicate. The phenylenediamine antiozonant comprised 2 parts of N,N'-dicyclohexyl-p-phenylenediamine. The magnesium silicate also was used in a concentration of 2 parts. The Mooney scorch properties were substantially the same for both samples as follows. The sample containing the antiozonant but no magnesium silicate gave a 5 pt. rise of 17.0 and a 20 pt. rise of 18.5 minutes, whereas the sample containing both the antiozonant and the magnesium silicate gave a 5 pt. rise of 165 and a 20 pt. rise of 17.7 minutes.

EXAMPLE VII

Another series of evaluations was made using a different SBR rubber formulation. The antiozonant used in this example was N,N'-di-(1,4-dimethylpentyl)-p-phenylenediamine and was used in a concentration of 3 phr. This sample of rubber containing the antiozonant but no added scorch retarder gave a 5 pt. rise of 17.1 minutes and 20 pt. rise of 18.6 minutes. Another sample containing the antiozonant and 2 phr of Mordenite (silica-alumina composite) gave a 5 pt. rise of 17.0 and a 20 pt. rise of 18.4. It will be noted that the silica-alumina composite was of no effect in retarding scorch.

Another evaluation was made in the same manner as described above but using 2 phr of silica. The sample containing both the phenylenediamine antiozonant and the silica gave a 5 pt. rise of 17.6 and 20 pt. rise of 19.0 minutes. Here again it will be noted that the silica was of substantially no benefit in retarding scorch.

EXAMPLE VIII

Natural rubber is compounded in a conventional manner to contain 3 phr. of N-phenyl-N'-(1,3-dimethylbutyl)-p-phenylenediamine and 3 phr. of calcium silicate. The rubber is protected against ozone cracking and also has a higher Mooney scorch value.

EXAMPLE IX

This example illustrates the use of calcium silicate as a scorch retarder in nitrile rubber. The nitrile rubber is compounded in a conventional manner to include 3 phr. of N,N-di-(1-methylheptyl)-p-phenylenediamine and 4 phr. of calcium silicate. Here again, the rubber will be protected against ozone cracking and also has a longer scorch value.

I claim as my invention:

1. Curable rubber composition containing a phenylenediamine antiozonant and from about 2 to about 10 parts by weight per 100 parts of rubber hydrocarbon of calcium silicate as scorch retarder.

2. The composition of claim 1 in which the calcium silicate is in a concentration of from 3 to 7 parts.

3. The composition of claim 1 in which the antiozonant is N,N'-di-sec-alkyl-p-phenylenediamine in which each alkyl contains from 3 to about 20 carbon atoms.

4. The composition of claim 3 in which the antiozonant is N,N'-di-sec-heptyl-p-phenylenediamine.

5. The composition of claim 3 in which the antiozonant is N,N'-di-sec-octyl-p-phenylenediamine.

6. The composition of claim 1 in which the antiozonant is N-phenyl-N'-sec-alkyl-p-phenylenediamine in which the alkyl contains from 3 to about 20 carbon atoms.

7. The composition of claim 1 in which the antiozonant is N,N'-di-cyclohexyl-p-phenylenediamine.

8. The composition of claim 1 in which the rubber is butadiene-styrene copolymer.

9. The composition of claim 1 in which the rubber is nitrile rubber.

10. The composition of claim 1 in which the rubber is natural rubber.

References Cited

UNITED STATES PATENTS 3,441,525  4/1969  Kern et al. _____ 260—45.9

MORRIS LIEBMAN, Primary Examiner

H. H. FLETCHER, Assistant Examiner

U.S. Cl. X.R.

106—288; 260—45.9, 762